United States Patent
Yukimura et al.

(10) Patent No.: US 9,951,197 B2
(45) Date of Patent: Apr. 24, 2018

(54) METHOD FOR PRODUCING RUBBER COMPOSITION

(71) Applicant: BRIDGESTONE CORPORATION, Chuo-ku, Tokyo (JP)

(72) Inventors: Noriaki Yukimura, Kodaira (JP); Satoshi Horie, Kodaira (JP); Takumi Toda, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/368,743

(22) PCT Filed: Dec. 21, 2012

(86) PCT No.: PCT/JP2012/083348
§ 371 (c)(1),
(2) Date: Jun. 25, 2014

(87) PCT Pub. No.: WO2013/099822
PCT Pub. Date: Jul. 4, 2013

(65) Prior Publication Data
US 2014/0350174 A1  Nov. 27, 2014

(30) Foreign Application Priority Data
Dec. 26, 2011 (JP) ................. 2011-284444

(51) Int. Cl.
*C08K 3/36* (2006.01)
*C08J 3/20* (2006.01)
*C08K 5/405* (2006.01)
*C08K 5/548* (2006.01)

(52) U.S. Cl.
CPC .................. *C08K 3/36* (2013.01); *C08J 3/20* (2013.01); *C08K 5/405* (2013.01); *C08K 5/548* (2013.01); *C08J 2309/06* (2013.01)

(58) Field of Classification Search
CPC .......... C08K 3/36; C08K 5/405; C08K 5/548; C08J 3/30
USPC ....................................................... 525/105
See application file for complete search history.

(56) References Cited

U.S. PATENT DOCUMENTS

| | | | |
|---|---|---|---|
| 4,222,915 A | 9/1980 | Wolff et al. | |
| 5,939,493 A * | 8/1999 | Hojo ................ | C08K 5/17 524/137 |
| 6,420,488 B1 | 7/2002 | Penot | |
| 7,441,574 B2 * | 10/2008 | Koster et al. ............ | 152/209.5 |
| 9,365,699 B2 * | 6/2016 | Hirata ................ | C08J 3/20 |
| 2001/0034389 A1 | 10/2001 | Vasseur | |
| 2003/0105242 A1 * | 6/2003 | Penot ................ | 525/332.6 |
| 2003/0144394 A1 | 7/2003 | Penot et al. | |
| 2005/0085594 A1 * | 4/2005 | Waddell ............. | C08K 5/405 525/330.7 |
| 2006/0258779 A1 | 11/2006 | Bailey et al. | |
| 2009/0221751 A1 | 9/2009 | Hasse et al. | |
| 2010/0105805 A1 | 4/2010 | Sasaka | |
| 2014/0107285 A1 * | 4/2014 | Hirata ................ | C08J 3/20 524/575 |

FOREIGN PATENT DOCUMENTS

| | | |
|---|---|---|
| CN | 103619920 A | 3/2014 |
| JP | 54-146843 A | 11/1979 |
| JP | 11-130908 A | 5/1999 |
| JP | 2002-521515 A | 7/2002 |
| JP | 2002-521516 A | 7/2002 |
| JP | 2003-523472 A | 8/2003 |
| JP | 2003-530443 A | 10/2003 |
| JP | 2009-524715 A | 7/2009 |
| WO | 03078475 A1 | 9/2003 |
| WO | 2008/123306 A1 | 10/2008 |
| WO | 2012 147746 * | 11/2012 |

OTHER PUBLICATIONS

International Search Report for PCT/JP2012/083348 dated Mar. 12, 2013.
Office Action dated May 6, 2015 in corresponding Chinese Patent Application No. 201280064346.7.
Communication dated Jul. 10, 2015, issued by the European Patent Office in corresponding European Application No. 12863419.3.

* cited by examiner

*Primary Examiner* — Kuo Liang Peng
(74) *Attorney, Agent, or Firm* — Sughrue Mion, PLLC

(57) ABSTRACT

The present invention relates to a method for producing a rubber composition obtained by compounding a rubber component (A) containing at least one kind selected from natural rubber and synthetic diene rubber, a filler containing an inorganic filler (B), a silane coupling agent (C), and thiourea, the method comprising kneading the rubber composition in plural stages, the rubber component (A), the whole or a part of the inorganic filler (B), the whole or a part of the silane coupling agent (C), and the thiourea being kneaded in the first stage of kneading, and thus provides a method for producing a rubber composition excellent in low-heat-generation property through enhancement of the reactivity between the coupling agent and the rubber component.

12 Claims, No Drawings

METHOD FOR PRODUCING RUBBER COMPOSITION

CROSS REFERENCE TO RELATED APPLICATIONS

This application is a National Stage of International Application No. PCT/JP2012/083348 filed Dec. 21, 2012, claiming priority based on Japanese Patent Application No. 2011-284444, filed Dec. 26, 2011, the contents of all of which are incorporated herein by reference in their entirety.

TECHNICAL FIELD

The present invention relates to a method for producing a rubber composition containing an inorganic filler and having an improved low-heat-generation property.

BACKGROUND ART

The use of silica as a filler is effective as a technique of achieving both reduction of the rolling resistance and enhancement of the braking performance on a wet road surface simultaneously. In this case, a silane coupling agent is necessarily used in combination with silica for ensuring further reduction of the loss and enhancement of the abrasion resistance. The silane coupling agent also has a function of preventing a vulcanization accelerator from being adsorbed on the silica surface through mutual action with the silica surface.

In the case where a silane coupling agent is used, however, an unreacted component may remain in rubber to cause rubber burning on kneading. Accordingly, it has been known that a small amount of a silane coupling agent is used in combination with a nonionic surfactant to provide a rubber composition that is excellent in low-loss property, wet performance, abrasion resistance, processability and the like without occurrence of rubber burning (see PTL 1).

In this case, however, the reaction between the silane coupling agent and silica may be inhibited due to the rapid adsorption of the nonionic surfactant to the silica surface. As a result, the reinforcement property of the silica and the rubber component may be reduced, and the rubber composition may be deteriorated in abrasion resistance.

PTL 2 proposes a rubber composition containing, as basic components, at least (i) one kind of a diene elastomer, (ii) a white filler as a reinforcing filler and (iii) an alkoxysilane polysulfide as a coupling agent (white filler/diene elastomer), along with (iv) an enamine and (v) a guanidine derivative.

PTL 3 discloses a rubber composition containing, as basic components, at least (i) one kind of a diene elastomer, (ii) a white filler as a reinforcing filler and (iii) an alkoxysilane polysulfide as a coupling agent (white filler/diene elastomer), along with (iv) zinc dithiophosphate and (v) a guanidine derivative.

PTL 4 describes a rubber composition containing at least (i) a diene elastomer, (ii) an inorganic filler as a reinforcing filler and (iii) an alkoxysilane polysulfide (PSAS) as a coupling agent (inorganic filler/diene elastomer), as basic components, in combination with (iv) an aldimine (R—CH=N—R) and (v) a guanidine derivative.

PTL 5 proposes a rubber composition based on at least (i) a diene elastomer, (ii) an inorganic filler as a reinforcing filler and (iii) an alkoxysilane polysulfide as a coupling agent, associated with (iv) 1,2-dihydropyridine and (v) a guanidine derivative.

Examples where a silane coupling agent is enhanced in the activity of the coupling function thereof in consideration of the kneading condition include PTL 6.

However, these inventions are still not sufficient in the reaction between the silane coupling agent and the rubber composition, and there are room of improvement in the enhancement of the low-heat-generation property.

CITATION LIST

Patent Literatures

PTL 1: JP-A-11-130908
PTL 2: JP-T-2002-521515
PTL 3: JP-T-2002-521516
PTL 4: JP-T-2003-530443
PTL 5: JP-T-2003-523472
PTL 6: WO 2008/123306

SUMMARY OF INVENTION

Technical Problem

Under the circumstances, an object of the present invention is to provide a method for producing a rubber composition excellent in low-heat-generation property through enhancement of reactivity between a coupling agent and a rubber component.

Solution to Problem

For solving the problem, the present inventors have found that the activity of the coupling function may be further enhanced by mixing thiourea with a rubber composition obtained by compounding a rubber component (A) containing at least one kind selected from natural rubber and synthetic diene rubber, a filler containing an inorganic filler (B), and a silane coupling agent (C), and thus the present invention has been completed.

The present invention thus relates to:

(1) a method for producing a rubber composition obtained by compounding a rubber component (A) containing at least one kind selected from natural rubber and synthetic diene rubber, a filler containing an inorganic filler (B), a silane coupling agent (C), and thiourea, the method comprising kneading the rubber composition in plural stages, the rubber component (A), the whole or a part of the inorganic filler (B), the whole or a part of the silane coupling agent (C), and the thiourea being kneaded in the first stage of kneading.

Advantageous Effects of Invention

According to the present invention, the addition of thiourea in the first stage of kneading enhances the reactivity between the silane coupling agent and the rubber component, and thus the following advantageous effects may be exhibited.

(1) The reinforcing property of the silica and the rubber component is enhanced.

(2) The amount of the silane coupling agent that remains unreacted is decreased to prevent rubber rubber scorch.

(3) The dispersion of silica is effectively improved, and thus the rubber composition is favorably enhanced in the low-heat-generation property.

(4) Modified rubber is formed since thiourea is capable of being reacted directly with the rubber component, which improves the dispersion of the filler, and thus a further enhanced low-heat-generation property is achieved.

(5) Thiourea thus reacted with the rubber component is capable of undergoing mutual action with silica and carbon black, and thus not only silica but also carbon black are enhanced in dispersion thereof.

(6) As compared to thiourea derivatives having a substituent, such as diphenylthiourea, dibutylthiourea and trimethylthiourea, thiourea having no substituent has a high activation effect of the reaction between the silane coupling agent and the rubber component, and has a high reactivity with the rubber component.

(7) Thiourea having no substituent has a high reactivity with the rubber component and thus does not remain as a foreign matter in the rubber, thereby enhancing the abrasion resistance.

As described above, the method for producing a rubber composition of the present invention may provide a rubber composition that is excellent in low-heat-generation property and abrasion resistance.

DESCRIPTION OF EMBODIMENTS

The present invention will be described in detail below.

The method for producing a rubber composition of the present invention is a method for producing a rubber composition obtained by compounding a rubber component (A) containing at least one kind selected from natural rubber and synthetic diene rubber, a filler containing an inorganic filler (B), a silane coupling agent (C), and thiourea, in which the method comprises kneading the rubber composition in plural stages, and the rubber component (A), the whole or a part of the inorganic filler (B), the whole or a part of the silane coupling agent (C), and the thiourea are kneaded in the first stage of kneading.

The mass ratio of the thiourea to the silane coupling agent (C) in the rubber composition in the first stage of kneading (thiourea/silane coupling agent (C)) is preferably from 2/100 to 100/100. This is because when the mass ratio is 2/100 or more, the silane coupling agent (C) may be sufficiently activated, and when the mass ratio is 100/100 or less, the vulcanization rate may not be largely influenced thereby. The mass ratio of the thiourea to the silane coupling agent (C) in the rubber composition in the first stage of kneading (thiourea/silane coupling agent (C)) is more preferably from 4/100 to 80/100, and particularly preferably from 4/100 to 50/100.

According to the production method of the present invention, the rubber composition, which contains a rubber component (A) containing at least one kind selected from natural rubber and synthetic diene rubber, a filler containing an inorganic filler (B), a silane coupling agent (C), and thiourea, is enhanced in the reactivity between the coupling agent and the rubber composition, and thus has excellent low-heat-generation property.

Thiourea used in the present invention is in the form of white solid having a molecular formula $CH_4N_2S$ and a molecular weight of 76.1, and is industrially produced by Sakai Chemical Industry Co., Ltd., Mitsui Fine Chemical, Inc., Nippon Chemical Industrial Co., Ltd., and the like.

For further enhancing the dispersion of the inorganic filler, such as silica, in the rubber composition, the maximum temperature of the rubber composition in the first stage of kneading is preferably from 120 to 190° C., more preferably from 130 to 175° C., and further preferably from 140 to 170° C. The kneading time is preferably from 10 seconds to 20 minutes, more preferably from 10 seconds to 10 minutes, and further preferably from 30 seconds to 5 minutes.

In the first stage of kneading in the present invention, thiourea may be kneaded simultaneously with the rubber component (A), the whole or a part of the inorganic filler (B), the whole or a part of the silane coupling agent (C), or after kneading these components, thiourea may be added thereto, followed by further kneading. The period of time from the addition of the rubber component (A), the whole or a part of the inorganic filler (B) and the whole or a part of the silane coupling agent (C) in the first stage of kneading to the addition of thiourea in the course of the first stage of kneading is preferably from 0 to 180 seconds. The upper limit of the period of time is more preferably 150 seconds or less, and further preferably 120 seconds or less. When the period of time is 10 seconds or more, the reaction between the components (B) and (C) may sufficiently proceed. When the period of time exceeds 180 seconds, no further advantageous effect may be obtained since the reaction of the components (B) and (C) has sufficiently proceeded, and thus the upper limit thereof is preferably 180 seconds.

The kneading process of the rubber composition in the present invention comprises at least two stages, i.e., the first stage of kneading compounding no vulcanizing agent, and the final stage of kneading compounding a vulcanizing agent and the like added, and may further comprise depending on necessity an intermediate stage of kneading compounding no vulcanizing agent or the like. The vulcanizing agent herein is a substance that is capable of crosslinking polymer chains of conjugated diene rubber, which is a plastic material, to form a network structure, and representative examples thereof include sulfur. The vulcanizing agent may be roughly classified into an inorganic vulcanizing agent and an organic vulcanizing agent, specific examples of the former include sulfur (such as powder sulfur, sulfur flower, deoxidized sulfur, precipitated sulfur, colloidal sulfur, polymeric sulfur and insoluble sulfur) and sulfur monochloride, and specific examples of the latter include materials that release active sulfur through thermal dissociation, such as morpholine disulfide and alkylphenol disulfide. Specific examples of the organic sulfur-containing vulcanizing agent are also described in "Gomu Kogyo Binran (Rubber Industry Handbook), 4th Ed." (published by The Society of Rubber Science and Technology, Japan, January, Heisei 6 (1994)), Chapter III Mixed Chemicals, Section 1 Vulcanizing Agent.

The first stage of kneading in the present invention means the initial stage of kneading the rubber component (A), the inorganic filler (B) and the silane coupling agent (C), and does not include a stage of kneading only the rubber component (A) and a filler without adding the silane coupling agent (C) in the initial stage and a stage of preliminarily kneading only the rubber component (A).

An intermediate stage of kneading may be provided after the first stage of kneading in the case where a master batch is difficult to produce only by the first stage of kneading or in the case where it is desired.

In the case where the intermediate stage is provided after the first stage and before the final stage, the maximum temperature of the rubber composition in the intermediate stage of kneading is preferably from 120 to 190° C., more preferably from 130 to 175° C., and further preferably from 140 to 170° C. The kneading time is preferably from 10 seconds to 20 minutes, more preferably from 10 seconds to 10 minutes, and further preferably from 30 seconds to 5 minutes. In the case where the intermediate stage is contained, the temperature is preferably lowered by 10° C. or more from the temperature on completing the preceding stage of kneading, followed by performing the subsequent stage.

The final stage of kneading means a step of kneading with a vulcanizing agent added thereto. The maximum temperature of the rubber composition in the final stage is preferably from 60 to 140° C., more preferably from 80 to 120° C., and further preferably from 100 to 120° C. The kneading time is preferably from 10 seconds to 20 minutes, more preferably from 10 seconds to 10 minutes, and further preferably from 20 seconds to 5 minutes.

On transferring from the first stage or the intermediate stage to the final stage, the temperature is preferably lowered by 10° C. or more from the temperature on completing the preceding stage of kneading, followed by performing the subsequent stage.

For example, in the first stage of kneading, the rubber component (A), the whole or a part of the inorganic filler (B) and the whole or a part of the silane coupling agent (C) may be kneaded as the first master batch kneading step, and after spontaneous cooling and ripening, the materials may be further kneaded with thiourea added thereto as the intermediate stage.

The silane coupling agent (C) used in the rubber composition and the method for producing the same of the present invention is preferably at least one compound selected from the group consisting of compounds represented by the following general formulae (I) to (IV).

By using the silane coupling agent (C) of these kinds, the rubber composition of the present invention may be further excellent in processability on rubber processing and may provide a tire that is further improved in abrasion resistance.

The following general formulae (I) to (IV) will be described in this order below.

[Chem. 1]

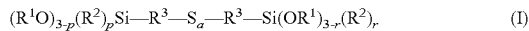

$$(R^1O)_{3-p}(R^2)_p Si—R^3—S_a—R^3—Si(OR^1)_{3-r}(R^2)_r \quad (I)$$

In the formula, when there are plural $R^1$'s, the $R^1$'s may be the same as or different from each other, and each represents a substituent selected from a linear, cyclic or branched alkyl group having from 1 to 8 carbon atoms, a linear or branched alkoxyalkyl group having from 2 to 8 carbon atoms, and a silanol group; when there are plural $R^2$'s, the $R^2$'s may be the same as or different from each other, and each represents a linear, cyclic or branched alkyl group having from 1 to 8 carbon atoms; when there are plural $R^3$'s, the $R^3$'s may be the same as or different from each other, and each represents a linear or branched alkylene group having from 1 to 8 carbon atoms; a represents a number of from 2 to 6 in terms of average value; and p and r may be the same as or different from each other and each represents a number of from 0 to 3 in terms of average value, provided that both p and r are not 3 simultaneously.

Specific examples of the silane coupling agent (C) represented by the general formula (I) include
bis(3-triethoxysilylpropyl)tetrasulfide,
bis(3-trimethoxysilylpropyl)tetrasulfide,
bis(3-methyldimethoxysilylpropyl)tetrasulfide,
bis(2-triethoxysilylethyl)tetrasulfide,
bis(3-triethoxysilylpropyl)disulfide,
bis(3-trimethoxysilylpropyl)disulfide,
bis(3-methyldimethoxysilylpropyl)disulfide,
bis(2-triethoxysilylethyl)disulfide,
bis(3-triethoxysilylpropyl)trisulfide,
bis(3-trimethoxysilylpropyl)trisulfide,
bis(3-methyldimethoxysilylpropyl)trisulfide,
bis(2-triethoxysilylethyl)trisulfide,
bis(3-monoethoxydimethylsilylpropyl)tetrasulfide,
bis(3-monoethoxydimethylsilylpropyl)trisulfide,
bis(3-monoethoxydimethylsilylpropyl)disulfide,
bis(3-monomethoxydimethylsilylpropyl)tetrasulfide,
bis(3-monomethoxydimethylsilylpropyl)trisulfide,
bis(3-monomethoxydimethylsilylpropyl)disulfide,
bis(2-monoethoxydimethylsilylethyl)tetrasulfide,
bis(2-monoethoxydimethylsilylethyl)trisulfide and
bis(2-monoethoxydimethylsilylethyl)disulfide.

[Chem. 2]

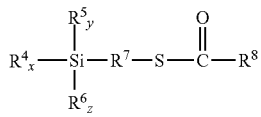

$$R^4{}_x—\underset{\underset{R^6{}_z}{|}}{\overset{\overset{R^5{}_y}{|}}{Si}}—R^7—S—\overset{\overset{O}{\|}}{C}—R^8 \quad (II)$$

In the formula, $R^4$ represents a monovalent group selected from —Cl, —Br, $R^9O—$, $R^9C(=O)O—$, $R^9R^{10}C=NO—$, $R^9R^{10}CNO—$, $R^9R^{10}N—$ and $—(OSiR^9R^{10})_h(OSiR^9R^{10}R^{11})$ (wherein $R^9$, $R^{10}$ and $R^{11}$ each represents a hydrogen atom or a monovalent hydrocarbon group having from 1 to 18 carbon atoms; and h represents a number of from 1 to 4 in terms of average value); $R^5$ represents $R^4$, a hydrogen atom or a monovalent hydrocarbon group having from 1 to 18 carbon atoms; $R^6$ represents $R^4$, $R^5$, a hydrogen atom or a group represented by $—(O(R^{12}O)_j)_{0.5}$ (wherein $R^{12}$ represents an alkylene group having from 1 to 18 carbon atoms; and j represents an integer of from 1 to 4); $R^7$ represents a divalent hydrocarbon group having from 1 to 18 carbon atoms; $R^8$ represents a monovalent hydrocarbon group having from 1 to 18 carbon atoms; and x, y and z represents numbers that satisfy relationships, $x+y+2z=3$, $0 \le x \le 3$, $0 \le y \le 2$, and $0 \le z \le 1$.

In the general formula (II), $R^8$, $R^9$, $R^{10}$ and $R^{11}$ may be the same as or different from each other, and each preferably represents a group selected from the group consisting of a linear, cyclic or branched alkyl group having from 1 to 18 carbon atoms, an alkenyl group, an aryl group and an aralkyl group. In the case where $R^5$ represents a monovalent hydrocarbon group having from 1 to 18 carbon atoms, they each preferably represent a group selected from a linear, cyclic or branched alkyl group, an alkenyl group, an aryl group and an aralkyl group. $R^{12}$ preferably represents a linear, cyclic or branched alkylene group, and particularly preferably a linear group. Examples of the group represented by $R^7$ include an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms and aralkylene group having from 7 to 18 carbon atoms. The alkylene group and the alkenylene group each may be linear or branched, and the cycloalkylene group, the cycloalkylalkylene group, the arylene group and the aralkylene group each may have a substituent, such as a lower alkyl group, on the ring. Preferred examples of the group represented by $R^7$ include an alkylene group having from 1 to 6 carbon atoms, and particularly preferred examples thereof include a linear alkylene group, such as a methylene group, an ethylene group, a trimethylene group, a tetramethylene group, a pentamethylene group and a hexamethylene group.

Specific examples of the monovalent hydrocarbon group having from 1 to 18 carbon atoms represented by $R^5$, $R^8$, $R^9$, $R^{10}$ and $R^{11}$ in the general formula (II) include a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group and a naphthylmethyl group.

Specific examples of the group represented by $R^{12}$ in the general formula (II) include a methylene group, an ethylene group, a trimethylene group, a tetramethylene group, a pentamethylene group, a hexamethylene group, an octamethylene group, a decamethylene group and a dodecamethylene group.

Specific examples of the silane coupling agent (C) represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethosysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane and 2-lauroylthioethyltrimethoxysilane. Among these, 3-octanoylthiopropyltriethoxysilane ("NXT Silane", a trade name, produced by Momentive Performance Materials, Inc.) is particularly preferred.

[Chem. 3]

$(R^{13}O)_{3-s}(R^{14})_s Si\text{—}R^{15}\text{—}S_k\text{—}R^{16}\text{—}S_k\text{—}R^{15}\text{—}Si(OR^{13})_{3-t}(R^{14})_t$ (III)

In the formula, when there are plural $R^{13}$'s, the $R^{13}$'s may be the same as or different from each other, and each represents a substituent selected from a linear, cyclic or branched alkyl group having from 1 to 8 carbon atoms, a linear or branched alkoxyalkyl group having from 2 to 8 carbon atoms, and a silanol group; when there are plural $R^{14}$'s, the $R^{14}$'s may be the same as or different from each other, and each represents a linear, cyclic or branched alkyl group having from 1 to 8 carbon atoms; when there are plural $R^{15}$'s, the $R^{15}$'s may be the same as or different from each other, and each represents a linear or branched alkylene group having from 1 to 8 carbon atoms; $R^{16}$ represents a divalent group selected from the general formulae (—S—$R^{17}$—S—), (—$R^{18}$—$S_{m1}$—$R^{19}$—) and (—$R^{20}$—$S_{m2}$—$R^{21}$—$S_{m3}$—$R^{22}$—) (wherein $R^{17}$ to $R^{22}$ each represents a divalent substituent selected from a divalent hydrocarbon group having from 1 to 20 carbon atoms, a divalent aromatic group and a divalent organic group containing a hetero element other than sulfur and oxygen; and m1, m2 and m3 each represent a number of 1 or more and less than 4 in terms of average value); plural k's may be the same as or different from each other, each represents a number of from 1 to 6 in terms of average value; and s and t each represents a number of from 0 to 3 in terms of average value, provided that both s and t are not 3 simultaneously.

Specific examples of the silane coupling agent (C) represented by the general formula (III) include compounds represented by average compositional formula $(CH_3CH_2O)_3Si\text{—}(CH_2)_3\text{—}S_2\text{—}(CH_2)_6\text{—}S_2\text{—}(CH_2)_3\text{—}Si(OCH_2CH_3)_3$, average compositional formula $(CH_3CH_2O)_3Si\text{—}(CH_2)_3\text{—}S_2\text{—}(CH_2)_{10}\text{—}S_2\text{—}(CH_2)_3\text{—}Si(OCH_2CH_3)_3$, average compositional formula $(CH_3CH_2O)_3Si\text{—}(CH_2)_3\text{—}S_3\text{—}(CH_2)_6\text{—}S_3\text{—}(CH_2)_3\text{—}Si(OCH_2CH_3)_3$, average compositional formula $(CH_3CH_2O)_3Si\text{—}(CH_2)_3\text{—}S_4\text{—}(CH_2)_6\text{—}S_2\text{—}(CH_2)_3\text{—}Si(OCH_2CH_3)_3$, average compositional formula $(CH_3CH_2O)_3Si\text{—}(CH_2)_3\text{—}S\text{—}(CH_2)_6\text{—}S_2\text{—}(CH_2)_3\text{—}Si(OCH_2CH_3)_3$, average compositional formula $(CH_3CH_2O)_3Si\text{—}(CH_2)_3\text{—}S\text{—}(CH_2)_6\text{—}S_{2.5}\text{—}(CH_2)_6\text{—}S\text{—}(CH_2)_3\text{—}Si(OCH_2CH_3)_3$, average compositional formula $(CH_3CH_2O)_3Si\text{—}(CH_2)_3\text{—}S\text{—}(CH_2)_6\text{—}S_3\text{—}(CH_2)_6\text{—}S\text{—}(CH_2)_3\text{—}Si(OCH_2CH_3)_3$, average compositional formula $(CH_3CH_2O)_3Si\text{—}(CH_2)_3\text{—}S\text{—}(CH_2)_6\text{—}S_4\text{—}(CH_2)_6\text{—}S\text{—}(CH_2)_3\text{—}Si(OCH_2CH_3)_3$, average compositional formula $(CH_3CH_2O)_3Si\text{—}(CH_2)_3\text{—}S\text{—}(CH_2)_{10}\text{—}S_2\text{—}(CH_2)_{10}\text{—}S\text{—}(CH_2)_3\text{—}Si(OCH_2CH_3)_3$, average compositional formula $(CH_3CH_2O)_3Si\text{—}(CH_2)_3\text{—}S_4\text{—}(CH_2)_6\text{—}S_4\text{—}(CH_2)_6\text{—}S_4\text{—}(CH_2)_3\text{—}Si(OCH_2CH_3)_3$, average compositional formula $(CH_3CH_2O)_3Si\text{—}(CH_2)_3\text{—}S_2\text{—}(CH_2)_6\text{—}S_2\text{—}(CH_2)_6\text{—}S_2\text{—}(CH_2)_3\text{—}Si(OCH_2CH_3)_3$, and average compositional formula $(CH_3CH_2O)_3Si\text{—}(CH_2)_3\text{—}S\text{—}(CH_2)_6\text{—}S_2\text{—}(CH_2)_6\text{—}S_2\text{—}(CH_2)_6\text{—}S\text{—}(CH_2)_3\text{—}Si(OCH_2CH_3)_3$.

The silane coupling agent (C) represented by the general formula (III) may be produced, for example, by the method described in JP-A-2006-167919.

[Chem. 4]

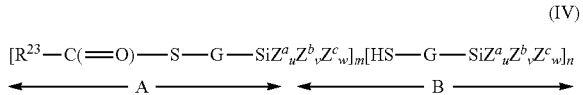
(IV)

$[R^{23}\text{—}C(\text{=}O)\text{—}S\text{—}G\text{—}SiZ^a_u Z^b_v Z^c_w]_m [HS\text{—}G\text{—}SiZ^a_u Z^b_v Z^c_w]_n$
$\xleftarrow{\quad A \quad}\xleftarrow{\quad B \quad}$ In the formula, $R^{23}$ represents a linear, branched or cyclic alkyl group having from 1 to 20 carbon atoms; plural G's, plural groups of which may be the same as or different from each other, and each represents an alkanediyl group or an alkenediyl group each having from 1 to 9 carbon atoms; plural $Z^a$'s may be the same as or different from each other, and each represents a functional group that is capable of being bonded to two silicon atoms and represents a functional group selected from $(\text{—O—})_{0.5}$, $(\text{—O-G-})_{0.5}$ and $(\text{—O-G-O—})_{0.5}$; plural $Z^b$'s may be the same as or different from each other, and each represent a functional group that is capable of being bonded to two silicon atoms and represents a functional group represented by $(\text{—O-G-O—})_{0.5}$; plural $Z^c$'s may be the same as or different from each other, and each represents a functional group selected from —Cl, —Br, —$OR^e$, $R^e C(\text{=}O)O$—, $R^e R^f C\text{=}NO$—, $R^e R^f N$—, $R^e$— and HO-G-O— (wherein G agrees with the aforementioned expression); $R^e$ and $R^f$ each represents a linear, branched or cyclic alkyl group having from 1 to 20 carbon atoms; m, n, u, v and w satisfy $1 \leq m \leq 20$, $0 \leq n \leq 20$, $0 \leq u \leq 3$, $0 \leq v \leq 2$, $0 \leq w \leq 1$, and $(u/2)+v+2w=2$ or 3; when there are plural A moieties, $Z^a_u$'s, $Z^b_v$'s and $Z^c_w$'s in the plural A moieties may be the same as or different from each other; and when there are plural B moieties, the respective $Z^a_u$'s, $Z^b_v$'s and $Z^c_w$'s in the plural B moieties may be the same as or different from each other.

Specific examples of the silane coupling agent (C) represented by the general formula (IV) include the chemical formula (V), the chemical formula (VI) and the chemical formula (VII) below.

[Chem. 5]

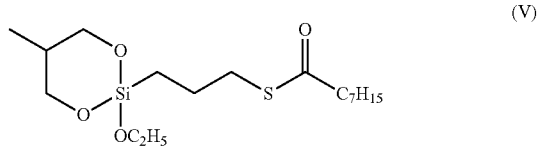
(V)

[Chem. 6]

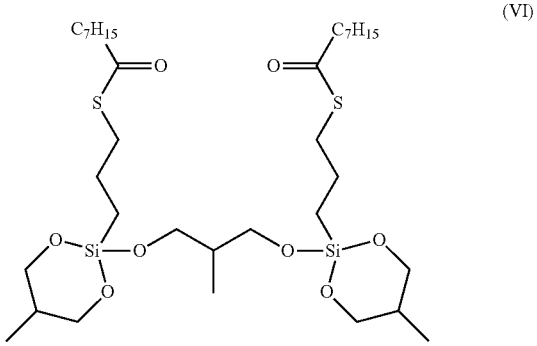
(VI)

[Chem. 7]

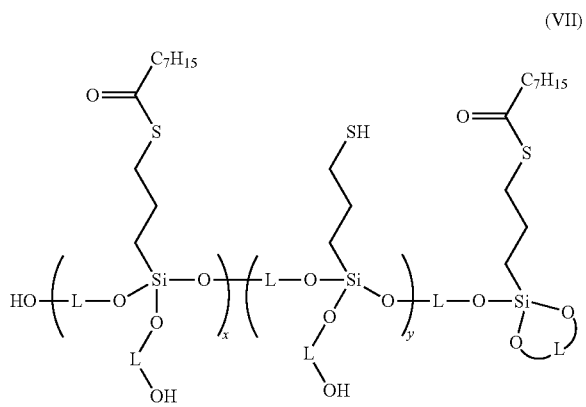
(VII)

In the formula, L's each independently represents an alkanediyl group or an alkenediyl group each having from 1 to 9 carbon atoms; x=m; and y=n.

As the silane coupling agent represented by the chemical formula (V), "NTX Low-V Silane", a trade name, produced by Momentive Performance Materials, Inc., is commercially available.

As the silane coupling agent represented by the chemical formula (VI), "NTX Ultra Low-V Silane", a trade name, produced by Momentive Performance Materials, Inc., is similarly commercially available.

As the silane coupling agent represented by the chemical formula (VII), "NTX-Z", a trade name, produced by Momentive Performance Materials, Inc., may be mentioned.

The silane coupling agents obtained as the general formula (II), the chemical formula (IV), the chemical formula (V) and the chemical formula (VI) have a protected mercapto group and thus may prevent vulcanization in the step before the vulcanizing step (i.e., scorch) from occurring, and accordingly the processability may be improved.

The silane coupling agents obtained as the chemical formulae (V), (VI) and (VII) have a large alkoxysilane carbon number and thus may form a less amount of volatile compounds (VOC, particularly an alcohol), and accordingly they are preferred in view of the working environment. The silane coupling agent of the chemical formula (VII) is further preferred since low-heat-generation property may be provided as the tire performance.

As the silane coupling agent (C) in the present invention, the compound represented by the general formula (I) is particularly preferred among the compounds represented by the general formulae (I) to (IV) since thiourea may easily cause activation of the polysulfide binding site, which is reacted with the rubber component (A).

In the present invention, the silane coupling agent (C) may be used solely or as a combination of two or more kinds thereof.

The mass ratio of the silane coupling agent (C) to the inorganic filler (B) (silane coupling agent (C)/inorganic filler (B)) in the rubber composition of the present invention is preferably from 1/100 to 60/100. When the ratio is 1/100 or more, the effect of enhancing the low-heat-generation property of the rubber composition may be exhibited, and when the ratio is 60/100 or less, the cost of the rubber composition may not be excessive, and thus the economical efficiency may be enhanced. The mass ratio (silane coupling agent (C)/inorganic filler (B)) is more preferably from 3/100 to 50/100, and particularly preferably from 3/100 to 20/100.

Examples of the synthetic diene rubber of the rubber component (A) used in the rubber composition and the method for producing the same of the present invention include styrene-butadiene copolymer rubber (SBR), polybutadiene rubber (BR), polyisoprene rubber (IR), acrylonitrile-butadiene copolymer rubber (NBR), butyl rubber (IIR) and ethylene-propylene-diene ternary copolymer rubber (EPDM), and the natural rubber and the synthetic diene rubber may be used solely or as a blend of two or more kinds thereof.

Examples of the inorganic filler (B) used in the rubber composition and the method for producing the same of the present invention include an inorganic compound represented by the following general formula (VIII).

$dM^1 \cdot xSiO_y \cdot zH_2O$ (VIII)

In the general formula (VIII), $M^1$ represents at least one selected from a metal selected from the group consisting of aluminum, magnesium, titanium, calcium and zirconium, oxides and hydroxides of these metals, hydrates thereof, and carbonate salts of these metals; and d, x, y and z represent an integer of from 1 to 5, an integer of from 0 to 10, an integer of from 2 to 5 and an integer of from 0 to 10, respectively.

In the case where both x and z are 0 in the general formula (VIII), the inorganic compound becomes at least one metal selected from aluminum, magnesium, titanium, calcium and zirconium, or an oxide or a hydroxide of the metal.

In the present invention, the inorganic filler (B) is preferably silica from the standpoint of achieving both the low rolling resistance and the abrasion resistance. Any of commercially available products may be used as the silica, and among these, wet method silica, dry method silica and colloidal silica are preferably used, and wet method silica is particularly preferably used. The silica preferably has a BET specific surface area (measured according to ISO 5794/1) of from 40 to 350 $m^2/g$. The silica having a BET surface area within the range is advantageously used since both the rubber reinforcement and the dispersibility in the rubber component may be achieved. In this point of view, the silica having a BET surface area in a range of from 80 to 350 $m^2/g$ is more preferred, and the silica having a BET surface area in a range of from 120 to 350 $m^2/g$ is particularly preferred. As such silica, a commercially available product such as "Nipsil AQ" (BET specific surface area: 205 $m^2/g$) and "Nipsil KQ", trade names, both produced by Tosoh Silica Corporation, or "Ultrasil VN3" (BET specific surface area: 175 $m^2/g$), a trade name, produced by Degussa AG can be used.

As the inorganic compound represented by the general formula (VIII), crystalline aluminosilicate salts and the like containing hydrogen, an alkali metal or an alkaline earth metal, which compensates the charge, for example, alumina ($Al_2O_3$), such as γ-alumina and α-alumina, alumina hydrate ($Al_2O_3.H_2O$), such as boemite and diaspore, aluminum hydroxide ($Al(OH)_3$), such as gibbsite and bayerite, aluminum carbonate ($Al_2(CO_3)_2$), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide ($Ca(OH)_2$), aluminum magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate (such as $Al_2SiO_5$ and $Al_4.3SiO_4.5H_2O$), magnesium silicate (such as $Mg_2SiO_4$ and $MgSiO_3$), calcium silicate (such as $Ca_2.SiO_4$), aluminum calcium silicate (such as $Al_2O_3.CaO.2SiO_2$), magnesium calcium silicate ($CaMgSiO_4$), calcium carbonate ($CaCO_3$), zirconium oxide ($ZrO_2$), zirconium hydroxide ($ZrO(OH)_2.nH_2O$), zirconium carbonate ($Zr(CO_3)_2$), and various kinds of zeolite can be used. Furthermore, at least one selected from metallic aluminum, an oxide or a hydroxide of aluminum, hydrates thereof, and aluminum carbonate, where $M^1$ is aluminum in the general formula (VIII), is preferred.

The inorganic compound represented by the general formula (VIII) may be used solely or as a mixture of two or more kinds thereof. The inorganic compound preferably has an average particle diameter in a range of from 0.01 to 10 μm, and more preferably in a range of from 0.05 to 5 μm, from the standpoint of the balance among the kneading processability, the abrasion resistance and the wet grip performance, and the like.

As the inorganic filler (B) in the present invention, silica may be used solely, or silica and at least one of the inorganic compound represented by the general formula (VIII) may be used in combination.

The filler used in the rubber composition and the method for producing the same of the present invention may contain carbon black depending on necessity in addition to the inorganic filler (B). Carbon black contained may provide an effect of decreasing the electric resistance and preventing static charge. The carbon black used is not particularly limited, and preferred examples thereof used include carbon black of the grades SAF, ISAF, IISAF, N339, HAF, FEF, GPF and SRF, with high, medium or low structure, and particularly preferred examples among these include carbon black of the grades SAF, ISAF, IISAF, N339, HAF and FEF. The carbon black preferably has a nitrogen adsorption specific surface area of from 30 to 250 $m^2/g$ ($N_2SA$, measured according to JIS K6217-2 (2001)). The carbon black may be used solely or as a combination of two or more kinds thereof. In the present invention, the carbon black is not included in the inorganic filler (B).

The inorganic filler (B) used in the rubber composition and the method for producing the same of the present invention is preferably used in an amount of from 20 to 120 parts by mass per 100 parts by mass of the rubber component (A). The amount is preferably 20 parts by mass or more for ensuring the wet performance, and the amount is preferably 120 parts by mass or less for decreasing the rolling resistance. The amount thereof used is more preferably from 30 to 100 parts by mass.

The filler of the rubber composition of the present invention is preferably used in an amount of from 20 to 150 parts by mass per 100 parts by mass of the rubber component (A). The amount is preferably 20 parts by mass or more for enhancing the reinforcement of the rubber composition, and the amount is preferably 150 parts by mass or less for decreasing the rolling resistance.

The amount of the inorganic filler (B) in the filler is preferably 30% by mass or more, more preferably 40% by mass or more, and further preferably 70% by mass or more.

In the case where silica is used as the inorganic filler (B), the amount of silica in the filler is preferably 30% by mass or more.

In the method for producing a rubber composition of the present invention, a filler dispersibility improver may be mixed therein depending on necessity. As the filler dispersibility improver, at least one selected from a nonionic surfactant and an aliphatic tertiary amine is preferred. The amount of the nonionic surfactant and/or the aliphatic tertiary amine mixed therein is preferably from 0.2 to 10 parts by mass, and more preferably from 0.5 to 8 parts by mass, per 100 parts by mass of the rubber.

Specific examples of the nonionic surfactant include lauric acid monoisopropanolamide and glycerol monostearate, and specific examples of the aliphatic tertiary amine include N,N-dimethylstearylamine.

The lauric acid monoisopropanolamide may be produced according to the production example described later or may be available as "Amisol PLME", a trade name, produced by Kawaken Fine Chemicals Co., Ltd., and "Amicol LMIP", a trade name, produced by Miyoshi Oil & Fat Co., Ltd.

The glycerol monostearate may be available, for example, as "Rikemal S-100", "Rikemal S-100P" and "Rikemal S-100A", trade names, produced by Riken Vitamin Co., Ltd., and "Rheodol MS-50" and "Rheodol MS-60", trade names, produced by Kao Corporation.

N,N-Dimethylstearylamine may be available, for example, as "Farmin DM8680" and "Farmin DM8098", trade names, produced by Kao Corporation.

In the method for producing a rubber composition of the present invention, the filler dispersibility improver is preferably mixed in the first stage of kneading.

In the method for producing a rubber composition of the present invention, various kinds of mixing agents that are ordinarily used in a rubber composition, such as a vulcanization activator, such as stearic acid, a resin acid and zinc oxide, and an antiaging agent, may be kneaded depending on necessity in the first stage of kneading or the final stage of kneading, or in the intermediate stage between the first stage and the final stage.

Examples of the kneading equipment in the production method of the present invention include a Banbury mixer, a roll mixer, an intensive mixer, a kneader and a twin-screw extruder.

EXAMPLE

The present invention will be described in more detail with reference to examples below, but the present invention is not limited to the examples.

The low-heat-generation property (tan δ index) and the abrasion resistance (index) were evaluated in the following manners.

Low-Heat-Generation Property (Tan δ Index)

The value of tan δ was measured with a spectrometer, produced by Ueshima Seisakusho Co., Ltd., (dynamic viscoelasticity measuring device) at a frequency of 52 Hz, an initial strain of 10%, a measuring temperature of 60° C. and a dynamic strain of 1%, and was expressed in terms of index with the tan δ of Comparative Example 1, 4, 7, 10 or 13 taken as 100. A smaller index means better low-heat-generation property and a smaller hysteresis loss.

low-heat-generation property index=((tan δ of vulcanized rubber composition tested)/(tan δ of vulcanized rubber composition of Comparative Example 1, 4, 7, 10 or 13))×100

Abrasion Resistance (Index)

The test was performed according to JIS K6264-2 (2005) with a Lambourn abrasion tester at room temperature and a slip ratio of 25%, and the reciprocal of the abrasion amount was expressed in terms of index with the value of Comparative Example 1, 4, 7, 10 or 13 taken as 100. A larger value means better abrasion resistance.

abrasion resistance index=((abrasion amount of vulcanized rubber composition of Comparative Example 1, 4, 7, 10 or 13)/(abrasion amount of vulcanized rubber composition tested))×100

Production Example 1

350 g (1.63 mol) of methyl laurate and 122.6 g (1.63 mol) of 2-amino-1-propanol were charged in a 500-mL four-neck flask, to which sodium methoxide was added in an amount of 0.05% by mass based on the resulting mixture, and the mixture was stirred under reduced pressure (45 mmHg) in a nitrogen atmosphere at 85° C. for 7 hours while removing methanol formed through the reaction. Thereafter, sodium methoxide as a catalyst was neutralized with an equivalent amount of phosphoric acid, and the mixture was filtered to provide 396 g of lauric acid monoisopropanolamide.

Examples 1 to 18 and Comparative Examples 1 to 15

The components were kneaded with the formulations and the kneading methods shown in Tables 1 to 6 by using a Banbury mixer with the maximum temperature of the rubber composition in the first stage of mixing being controlled to 150° C., and thereby 33 kinds of rubber compositions were prepared. In the first stage of kneading the rubber composition in Examples 1 to 15 and Comparative Examples 2, 3, 5, 6, 8, 9, 11, 12, 14 and 15, the rubber component (A), the whole of the inorganic filler (B), the silane coupling agent (C) and thiourea or the thiourea derivative were added and kneaded. In the first stage of kneading the rubber composition in Examples 16 to 18, the rubber component (A), the whole of the inorganic filler (B), the silane coupling agent (C) and thiourea, and also as a filler dispersibility improver, lauric acid monoisopropanolamide, N,N-dimethylstearylamine or glycerol monostearate were added and kneaded. In the first stage of kneading the rubber composition in Comparative Examples 1, 4, 7, 10 and 13, thiourea and the thiourea derivative were not added, and the filler dispersibility improver was also not added.

The rubber composition was vulcanized at a temperature of 165° C., and the vulcanization time was determined as $t_c(90)$ (min)×1.5 ($t_c(90)$ was defined in JIS K6300-2 (2001)). The resulting 33 kinds of rubber compositions were evaluated for the low-heat-generation property (tan δ index) and the abrasion resistance (index) in the aforementioned manner. The results are shown in Tables 1 to 6.

TABLE 1

| | | | Example | | | Comparative Example | | |
|---|---|---|---|---|---|---|---|---|
| Parts by mass | | | 1 | 2 | 3 | 1 | 2 | 3 |
| Formulation | First stage of kneading | Solution-polymerized SBR *1 | 100 | 100 | 100 | 100 | 100 | 100 |
| | | Carbon black N220 *2 | 10 | 10 | 10 | 10 | 10 | 10 |
| | | Silica *3 | 50 | 50 | 50 | 50 | 50 | 50 |
| | | Silane coupling agent *4 | 5.0 | 5.0 | 5.0 | 5.0 | 5.0 | 5.0 |
| | | Aromatic oil | 30 | 30 | 30 | 30 | 30 | 30 |
| | | Thiourea *5 | 0.3 | 0.6 | 1.2 | — | — | — |
| | | Dibutylthiourea *6 | — | — | — | — | 1.2 | — |
| | | Diphenylthiourea *7 | — | — | — | — | — | 1.2 |
| | Final stage of kneading | Stearic acid | 2 | 2 | 2 | 2 | 2 | 2 |
| | | Antiaging agent 6PPD *8 | 1 | 1 | 1 | 1 | 1 | 1 |
| | | Antiaging agent TMDQ *9 | 1 | 1 | 1 | 1 | 1 | 1 |
| | | Zinc oxide | 2.5 | 2.5 | 2.5 | 2.5 | 2.5 | 2.5 |
| | | Vulcanization accelerator DPG *10 | 0.6 | 0.6 | 0.6 | 0.6 | 0.6 | 0.6 |
| | | Vulcanization accelerator MBTS *11 | 1.0 | 1.0 | 1.0 | 1.0 | 1.0 | 1.0 |
| | | Vulcanization accelerator TBBS *12 | 0.6 | 0.6 | 0.6 | 0.6 | 0.6 | 0.6 |
| | | Sulfur | 1.5 | 1.5 | 1.5 | 1.5 | 1.5 | 1.5 |
| Vulcanized properties | | Low-heat-generation property (tanδ index) | 79 | 75 | 70 | 100 | 94 | 95 |
| | | Abrasion resistance (index) | 103 | 105 | 109 | 100 | 95 | 94 |

TABLE 2

| | | | Example | | | Comparative Example | | |
|---|---|---|---|---|---|---|---|---|
| Parts by mass | | | 4 | 5 | 6 | 4 | 5 | 6 |
| Formulation | First stage of kneading | Solution-polymerized SBR *1 | 100 | 100 | 100 | 100 | 100 | 100 |
| | | Carbon black N220 *2 | 5.0 | 5.0 | 5.0 | 5.0 | 5.0 | 5.0 |
| | | Silica *3 | 80 | 80 | 80 | 80 | 80 | 80 |
| | | Silane coupling agent *4 | 5.0 | 5.0 | 5.0 | 5.0 | 5.0 | 5.0 |
| | | Aromatic oil | 30 | 30 | 30 | 30 | 30 | 30 |
| | | Thiourea *5 | 0.3 | 0.6 | 1.2 | — | — | — |
| | | Dibutylthiourea *6 | — | — | — | — | 1.2 | — |
| | | Diphenylthiourea *7 | — | — | — | — | — | 1.2 |

TABLE 2-continued

|  |  | Parts by mass | Example 4 | Example 5 | Example 6 | Comparative Example 4 | Comparative Example 5 | Comparative Example 6 |
|---|---|---|---|---|---|---|---|---|
|  | Final stage of kneading | Stearic acid | 2 | 2 | 2 | 2 | 2 | 2 |
|  |  | Antiaging agent 6PPD *8 | 1 | 1 | 1 | 1 | 1 | 1 |
|  |  | Antiaging agent TMDQ *9 | 1 | 1 | 1 | 1 | 1 | 1 |
|  |  | Zinc oxide | 2.5 | 2.5 | 2.5 | 2.5 | 2.5 | 2.5 |
|  |  | Vulcanization accelerator DPG *10 | 0.6 | 0.6 | 0.6 | 0.6 | 0.6 | 0.6 |
|  |  | Vulcanization accelerator MBTS *11 | 1.0 | 1.0 | 1.0 | 1.0 | 1.0 | 1.0 |
|  |  | Vulcanization accelerator TBBS *12 | 0.6 | 0.6 | 0.6 | 0.6 | 0.6 | 0.6 |
|  |  | Sulfur | 1.5 | 1.5 | 1.5 | 1.5 | 1.5 | 1.5 |
| Vulcanized properties |  | Low-heat-generation property (tanδ index) | 74 | 70 | 64 | 100 | 92 | 92 |
|  |  | Abrasion resistance (index) | 105 | 108 | 112 | 100 | 96 | 96 |

TABLE 3

|  |  | Parts by mass | Example 7 | Example 8 | Example 9 | Comparative Example 7 | Comparative Example 8 | Comparative Example 9 |
|---|---|---|---|---|---|---|---|---|
| Formulation | First stage of kneading | Emulsion-polymerized SBR *13 | 100 | 100 | 100 | 100 | 100 | 100 |
|  |  | Carbon black N220 *2 | 10 | 10 | 10 | 10 | 10 | 10 |
|  |  | Silica *3 | 50 | 50 | 50 | 50 | 50 | 50 |
|  |  | Silane coupling agent *4 | 5.0 | 5.0 | 5.0 | 5.0 | 5.0 | 5.0 |
|  |  | Aromatic oil | 30 | 30 | 30 | 30 | 30 | 30 |
|  |  | Thiourea *5 | 0.3 | 0.6 | 1.2 | — | — | — |
|  |  | Dibutylthiourea *6 | — | — | — | — | 1.2 | — |
|  |  | Diphenylthiourea *7 | — | — | — | — | — | 1.2 |
|  | Final stage of kneading | Stearic acid | 2 | 2 | 2 | 2 | 2 | 2 |
|  |  | Antiaging agent 6PPD *8 | 1 | 1 | 1 | 1 | 1 | 1 |
|  |  | Antiaging agent TMDQ *9 | 1 | 1 | 1 | 1 | 1 | 1 |
|  |  | Zinc oxide | 2.5 | 2.5 | 2.5 | 2.5 | 2.5 | 2.5 |
|  |  | Vulcanization accelerator DPG *10 | 0.6 | 0.6 | 0.6 | 0.6 | 0.6 | 0.6 |
|  |  | Vulcanization accelerator MBTS *11 | 1.0 | 1.0 | 1.0 | 1.0 | 1.0 | 1.0 |
|  |  | Vulcanization accelerator TBBS *12 | 0.6 | 0.6 | 0.6 | 0.6 | 0.6 | 0.6 |
|  |  | Sulfur | 1.5 | 1.5 | 1.5 | 1.5 | 1.5 | 1.5 |
| Vulcanized properties |  | Low-heat-generation property (tanδ index) | 80 | 75 | 70 | 100 | 93 | 94 |
|  |  | Abrasion resistance (index) | 105 | 106 | 108 | 100 | 94 | 94 |

TABLE 4

|  |  | Parts by mass | Example 10 | Example 11 | Example 12 | Comparative Example 10 | Comparative Example 11 | Comparative Example 12 |
|---|---|---|---|---|---|---|---|---|
| Formulation | First stage of kneading | Natural rubber *14 | 100 | 100 | 100 | 100 | 100 | 100 |
|  |  | Carbon black N220 *2 | 10 | 10 | 10 | 10 | 10 | 10 |
|  |  | Silica *3 | 50 | 50 | 50 | 50 | 50 | 50 |
|  |  | Silane coupling agent *4 | 5.0 | 5.0 | 5.0 | 5.0 | 5.0 | 5.0 |
|  |  | Aromatic oil | 30 | 30 | 30 | 30 | 30 | 30 |
|  |  | Thiourea *5 | 0.3 | 0.6 | 1.2 | — | — | — |
|  |  | Dibutylthiourea *6 | — | — | — | — | 1.2 | — |
|  |  | Diphenylthiourea *7 | — | — | — | — | — | 1.2 |
|  | Final stage of kneading | Stearic acid | 2 | 2 | 2 | 2 | 2 | 2 |
|  |  | Antiaging agent 6PPD *8 | 1 | 1 | 1 | 1 | 1 | 1 |
|  |  | Antiaging agent TMDQ *9 | 1 | 1 | 1 | 1 | 1 | 1 |
|  |  | Zinc oxide | 2.5 | 2.5 | 2.5 | 2.5 | 2.5 | 2.5 |
|  |  | Vulcanization accelerator DPG *10 | 0.6 | 0.6 | 0.6 | 0.6 | 0.6 | 0.6 |
|  |  | Vulcanization accelerator MBTS *11 | 1.0 | 1.0 | 1.0 | 1.0 | 1.0 | 1.0 |
|  |  | Vulcanization accelerator TBBS *12 | 0.6 | 0.6 | 0.6 | 0.6 | 0.6 | 0.6 |
|  |  | Sulfur | 1.5 | 1.5 | 1.5 | 1.5 | 1.5 | 1.5 |
| Vulcanized properties |  | Low-heat-generation property (tanδ index) | 75 | 71 | 68 | 100 | 90 | 91 |
|  |  | Abrasion resistance (index) | 101 | 100 | 100 | 100 | 91 | 91 |

TABLE 5

|  |  | Parts by mass | Example 13 | Example 14 | Example 15 | Comparative Example 13 | Comparative Example 14 | Comparative Example 15 |
|---|---|---|---|---|---|---|---|---|
| Formulation | First stage of kneading | Solution-polymerized SBR *1 | 70 | 70 | 70 | 70 | 70 | 70 |
|  |  | Solution-polymerized SBR *15 | 30 | 30 | 30 | 30 | 30 | 30 |

TABLE 5-continued

|  |  | Parts by mass | Example 13 | Example 14 | Example 15 | Comparative Example 13 | Comparative Example 14 | Comparative Example 15 |
|---|---|---|---|---|---|---|---|---|
|  |  | Carbon black N220 *2 | 10 | 10 | 10 | 10 | 10 | 10 |
|  |  | Silica *3 | 50 | 50 | 50 | 50 | 50 | 50 |
|  |  | Silane coupling agent *4 | 5.0 | 5.0 | 5.0 | 5.0 | 5.0 | 5.0 |
|  |  | Aromatic oil | 30 | 30 | 30 | 30 | 30 | 30 |
|  |  | Thiourea *5 | 0.3 | 0.6 | 1.2 | — | — | — |
|  |  | Dibutylthiourea *6 | — | — | — | — | 1.2 | — |
|  |  | Diphenylthiourea *7 | — | — | — | — | — | 1.2 |
|  | Final stage of kneading | Stearic acid | 2 | 2 | 2 | 2 | 2 | 2 |
|  |  | Antiaging agent 6PPD *8 | 1 | 1 | 1 | 1 | 1 | 1 |
|  |  | Antiaging agent TMDQ *9 | 1 | 1 | 1 | 1 | 1 | 1 |
|  |  | Zinc oxide | 2.5 | 2.5 | 2.5 | 2.5 | 2.5 | 2.5 |
|  |  | Vulcanization accelerator DPG *10 | 0.6 | 0.6 | 0.6 | 0.6 | 0.6 | 0.6 |
|  |  | Vulcanization accelerator MBTS *11 | 1.0 | 1.0 | 1.0 | 1.0 | 1.0 | 1.0 |
|  |  | Vulcanization accelerator TBBS *12 | 0.6 | 0.6 | 0.6 | 0.6 | 0.6 | 0.6 |
|  |  | Sulfur | 1.5 | 1.5 | 1.5 | 1.5 | 1.5 | 1.5 |
| Vulcanized properties |  | Low-heat-generation property (tanδ index) | 81 | 77 | 72 | 100 | 95 | 96 |
|  |  | Abrasion resistance (index) | 105 | 106 | 108 | 100 | 97 | 96 |

TABLE 6

|  |  | Parts by mass | Example 16 | Example 17 | Example 18 | Comparative Example 1 | Comparative Example 2 | Comparative Example 3 |
|---|---|---|---|---|---|---|---|---|
| Formulation | First stage of kneading | Solution-polymerized SBR *1 | 100 | 100 | 100 | 100 | 100 | 100 |
|  |  | Carbon black N220 *2 | 10 | 10 | 10 | 10 | 10 | 10 |
|  |  | Silica *3 | 50 | 50 | 50 | 50 | 50 | 50 |
|  |  | Silane coupling agent *4 | 5.0 | 5.0 | 5.0 | 5.0 | 5.0 | 5.0 |
|  |  | Aromatic oil | 30 | 30 | 30 | 30 | 30 | 30 |
|  |  | Thiourea *5 | 0.6 | 0.6 | 0.6 | — | — | — |
|  |  | Dibutylthiourea *6 | — | — | — | — | 1.2 | — |
|  |  | Diphenylthiourea *7 | — | — | — | — | — | 1.2 |
|  |  | Lauric acid monoisopropanolamide *16 | 2.0 | — | — | — | — | — |
|  |  | N,N-dimethylstearylamine *17 | — | 2.0 | — | — | — | — |
|  |  | Glycerol monostearate | — | — | 2.0 | — | — | — |
|  | Final stage of kneading | Stearic acid | 2 | 2 | 2 | 2 | 2 | 2 |
|  |  | Antiaging agent 6PPD *8 | 1 | 1 | 1 | 1 | 1 | 1 |
|  |  | Antiaging agent TMDQ *9 | 1 | 1 | 1 | 1 | 1 | 1 |
|  |  | Zinc oxide | 2.5 | 2.5 | 2.5 | 2.5 | 2.5 | 2.5 |
|  |  | Vulcanization accelerator DPG *10 | 0.6 | 0.6 | 0.6 | 0.6 | 0.6 | 0.6 |
|  |  | Vulcanization accelerator MBTS *11 | 1.0 | 1.0 | 1.0 | 1.0 | 1.0 | 1.0 |
|  |  | Vulcanization accelerator TBBS *12 | 0.6 | 0.6 | 0.6 | 0.6 | 0.6 | 0.6 |
|  |  | Sulfur | 1.5 | 1.5 | 1.5 | 1.5 | 1.5 | 1.5 |
| Vulcanized properties |  | Low-heat-generation property (tanδ index) | 70 | 71 | 69 | 100 | 94 | 95 |
|  |  | Abrasion resistance (index) | 105 | 106 | 105 | 100 | 95 | 94 |

[Note]
*1: Solution-polymerized SBR, "Toughden 2000", a trade name, produced by Asahi Kasei Corporation
*2: "#80", a trade name, produced by Asahi Carbon Co., Ltd.
*3: Nipsil AQ, produced by Tosoh Silica Corporation, BET surface area: 205 m²/g
*4: bis(3-triethoxysilylpropyl)disulfide (average sulfur chain length: 2.35), silane coupling agent, "Si75", a registered trade name produced by Evonik Industries AG
*5: thiourea, "Thiourea", a trade name, produced by Sakai Chemical Industry Co., Ltd.
*6: N,N'-dibutylthiourea, "Sanceler BUR", a trade name, produced by Sanshin Chemical Industry Co., Ltd.
*7: N,N'-diphenylthiourea, "Nocceler C", a trade name, produced by Ouchi Shinko Chemical Industrial Co., Ltd.
*8: N-(1,3-dimethylbutyl)-N'-phenyl-p-phenylenediamine, "Nocrac 6C", a trade name, produced by Ouchi Shinko Chemical Industrial Co., Ltd.
*9: 2,2,4-trimethyl-1,2-dihydroquinoline polymer, "Nocrac 224", a trade name, produced by Ouchi Shinko Chemical Industrial Co., Ltd.
*10: 1,3-Diphenylguanidine, "Sanceler D", a trade name, produced by Sanshin Chemical Industry Co., Ltd.
*11: di-2-benzothiazolyl disulfide, "Sanceler DM", a trade name, produced by Sanshin Chemical Industry Co., Ltd.
*12: N-tert-butyl-2-benzothiazolyl sulfenamide, "Sanceler NS", a trade name, produced by Sanshin Chemical Industry Co., Ltd.
*13: emulsion-polymerized SBR, "JSR 1500", a trade name, produced by JSR Corporation
*14: RSS #3
*15: solution-polymerized BR, "JSR BR01", a trade name, produced by JSR Corporation
*16: lauric acid monoisopropanolamide produced in Production Example 1
*17: N,N-dimethylstearylamine, "Farmin DM8098", a trade name, produced by Kao Corporation As apparent from Tables 1 to 6, the rubber compositions of Examples 1 to 18 were good in the low-heat-generation property (tan δ index) and the abrasion resistance (index), as compared to the comparative rubber compositions of Comparative Examples 1 to 15. The rubber compositions of Examples 16 to 18 were improved in the low-heat-generation property due to the filler dispersibility improver mixed in the first stage of kneading.

INDUSTRIAL APPLICABILITY

The method for producing a rubber composition of the present invention provides a rubber composition that is excellent in low-heat-generation property and abrasion resistance, and thus may be favorably applied to production methods of members of various kinds of tires for a passenger vehicle, a small pickup truck, a kei passenger vehicle, a kei pickup truck, a heavy vehicle (such as a truck, a bus and a construction vehicle), and particularly to a tread member of a pneumatic radial tire.

The invention claimed is:

1. A method for producing a rubber composition obtained by compounding a rubber component (A) containing at least one kind selected from natural rubber and synthetic diene rubber, a filler containing an inorganic filler (B), a silane coupling agent (C), and thiourea having no substituent, the method comprising kneading the rubber composition in plural stages, the rubber component (A), the whole or a part of the inorganic filler (B), the whole or a part of the silane coupling agent (C), the thiourea being kneaded in the first stage of kneading, and a vulcanizing agent and a vulcanization accelerator being compounded in the final stage of kneading, wherein the mass ratio of the thiourea to the silane coupling agent (C) in the rubber composition in the first stage of kneading (thiourea/silane coupling agent (C)) is from 2/100 to 100/100.

2. The method for producing a rubber composition according to claim 1, wherein the maximum temperature of the rubber composition in the first stage of kneading is from 120 to 190° C.

3. The method for producing a rubber composition according to claim 1, wherein the silane coupling agent (C) is at least one compound selected from the group consisting of compounds represented by the following general formulae (I) to (IV):

$$(R^1O)_{3-p}(R^2)_p Si—R^3—S_a—R^3—Si(OR^1)_{3-r}(R^2)_r \quad (I)$$

wherein when there are plural $R^1$'s, the $R^1$'s may be the same as or different from each other, and each represents a substituent selected from a linear, cyclic or branched alkyl group having from 1 to 8 carbon atoms, a linear or branched alkoxyalkyl group having from 2 to 8 carbon atoms, and a silanol group; when there are plural $R^2$'s, the $R^2$'s may be the same as or different from each other, and each represents a linear, cyclic or branched alkyl group having from 1 to 8 carbon atoms; when there are plural $R^3$'s, the $R^3$'s may be the same as or different from each other, and each represents a linear or branched alkylene group having from 1 to 8 carbon atoms; a represents a number of from 2 to 6 in terms of average value; and p and r may be the same as or different from each other and each represents a number of from 0 to 3 in terms of average value, provided that both p and r are not 3 simultaneously,

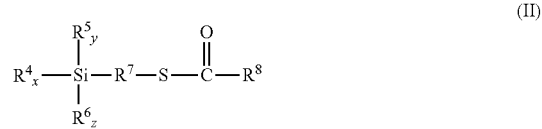

wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$— and —$(OSiR^9R^{10})_h$ $(OSiR^9R^{10}R^{11})$ (wherein $R^9$, $R^{10}$ and $R^{11}$ each represent a hydrogen atom or a monovalent hydrocarbon group having from 1 to 18 carbon atoms; and h represents a number of from 1 to 4 in terms of average value); $R^5$ represents $R^4$, a hydrogen atom or a monovalent hydrocarbon group having from 1 to 18 carbon atoms; $R^6$ represents $R^4$, $R^5$, a hydrogen atom or a group represented by —$(O(R^{12}O)_j)_{0.5}$ (wherein $R^{12}$ represents an alkylene group having from 1 to 18 carbon atoms; and j represents an integer of from 1 to 4); $R^7$ represents a divalent hydrocarbon group having from 1 to 18 carbon atoms; $R^8$ represents a monovalent hydrocarbon group having from 1 to 18 carbon atoms; and x, y and z represent numbers that satisfy relationships, x+y+2z=3, 0≤x≤3, 0≤y≤2, and 0≤z≤1, $$(R^{13}O)_{3-s}(R^{14})_s Si—R^{15}—S_k—R^{16}—S_k—R^{15}—Si(OR^{13})_{3-t}(R^{14})_t \quad (III)$$

wherein when there are plural $R^{13}$'s, the $R^{13}$'s may be the same as or different from each other, and each represents a substituent selected from a linear, cyclic or branched alkyl group having from 1 to 8 carbon atoms, a linear or branched alkoxyalkyl group having from 2 to 8 carbon atoms, and a silanol group; when there are plural $R^{14}$'s, the $R^{14}$'s may be the same as or different from each other, and each represents a linear, cyclic or branched alkyl group having from 1 to 8 carbon atoms; when there are plural $R^{15}$'s, the $R^{15}$'s may be the same as or different from each other, and each represents a linear or branched alkylene group having from 1 to 8 carbon atoms; $R^{16}$ represents a divalent group selected from the general formulae (—S—$R^{17}$—S—), (—$R^{18}$—$S_{m1}$—$R^{19}$—) and (—$R^{20}$—$S_{m2}$—$R^{21}$—$S_{m3}$—$R^{22}$—) (wherein $R^{17}$ to $R^{22}$ each represents a divalent substituent selected from a divalent hydrocarbon group having from 1 to 20 carbon atoms, a divalent aromatic group and a divalent organic group containing a hetero element other than sulfur and oxygen; and m1, m2 and m3 each represent a number of 1 or more and less than 4 in terms of average value); plural k's may be the same as or different from each other, and each represents a number of from 1 to 6 in terms of average value; and s and t each represents a number of from 0 to 3 in terms of average value, provided that both s and t are not 3 simultaneously,

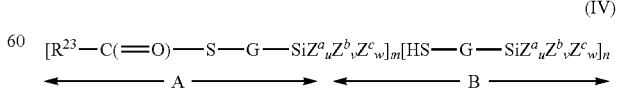

wherein $R^{23}$ represents a linear, branched or cyclic alkyl group having from 1 to 20 carbon atoms; plural G's may be the same as or different from each other, and each represents an alkanediyl group or an alkenediyl group each having from 1 to 9 carbon atoms; plural $Z^a$'s may be the same as or different from each other, and each represents a functional group that is capable of being bonded to two silicon atoms and represents a functional group selected from $(-O-)_{0.5}$, $(-O-G-)_{0.5}$ and $(-O-G-O-)_{0.5}$; plural $Z^b$'s may be the same as or different from each other, and each represents a functional group that is capable of being bonded to two silicon atoms and represents a functional group represented by $(-O-G-O-)_{0.5}$; plural $Z^c$'s may be the same as or different from each other, and each represents a functional group selected from $-Cl$, $-Br$, $-OR^e$, $R^eC(=O)O-$, $R^eR^fC=NO-$, $R^eR^fN-$, $R^e-$ and $HO-G-O-$ (wherein G agrees with the aforementioned expression); $R^e$ and $R^f$ each represent a linear, branched or cyclic alkyl group having from 1 to 20 carbon atoms; m, n, u, v and w satisfy $1 \leq m \leq 20$, $0 \leq n \leq 20$, $0 \leq u \leq 3$, $0 \leq v \leq 2$, $0 \leq w \leq 1$, and $(u/2)+v+2w=2$ or $3$; when there are plural A moieties, the respective $Z^a_u$'s, $Z^b_v$'s and $Z^c_w$'s in the plural A moieties may be the same as or different from each other; and when there are plural B moieties, the respective $Z^a_u$'s, $Z^b_v$'s and $Z^c_w$'s in the plural B moieties may be the same as or different from each other.

4. The method for producing a rubber composition according to claim 3, wherein the silane coupling agent (C) is the compound represented by the general formula (I).

5. The method for producing a rubber composition according to claim 1, wherein the inorganic filler (B) is silica.

6. The method for producing a rubber composition according to claim 1, wherein the amount of the inorganic filler (B) in the filler is 10% by mass or more.

7. The method for producing a rubber composition according to claim 1, wherein in the first stage of kneading, thiourea having no substituent is added and further kneaded within a period of 180 seconds or less after kneading the rubber component (A), the whole or a part of the inorganic filler (B), and the whole or a part of the silane coupling agent (C).

8. The method for producing a rubber composition according to claim 1, wherein the mass ratio of the thiourea having no substituent to the silane coupling agent (C) in the rubber composition in the first stage of kneading is from 4/100 to 80/100.

9. The method for producing a rubber composition according to claim 8, wherein the mass ratio of the thiourea having no substituent to the silane coupling agent (C) in the rubber composition in the first stage of kneading is from 4/100 to 50/100.

10. The method for producing a rubber composition according to claim 1,
wherein at least one filler dispersibility improver selected from a nonionic surfactant and an aliphatic tertiary amine is further mixed in the first Stage of kneading.

11. The method for producing a rubber composition according to claim 10,
wherein the amount of the nonionic surfactant and/or the aliphatic tertiary amine mixed therein is from 0.2 to 10 parts by mass, per 100 parts by mass of the rubber component (A).

12. The method for producing a rubber composition according to claim 1,
wherein the maximum temperature of the rubber composition in the first stage of kneading is from 130 to 190° C., and
wherein the maximum temperature of the rubber composition in the final stage of kneading is from 60 to 120° C.

* * * * *